(12) United States Patent
Dellea et al.

(10) Patent No.: US 9,156,216 B2
(45) Date of Patent: Oct. 13, 2015

(54) PROCESS FOR MANUFACTURING A SEGMENTED OPTICAL STRUCTURE

(75) Inventors: Olivier Dellea, La Talaudiere (FR); Pascal Fugier, Bernin (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 392 days.

(21) Appl. No.: 13/821,925

(22) PCT Filed: Sep. 9, 2011

(86) PCT No.: PCT/IB2011/053955
§ 371 (c)(1),
(2), (4) Date: May 2, 2013

(87) PCT Pub. No.: WO2012/035477
PCT Pub. Date: Mar. 22, 2012

(65) Prior Publication Data
US 2013/0209677 A1  Aug. 15, 2013

(30) Foreign Application Priority Data
Sep. 14, 2010 (FR) ..................... 10 57327

(51) Int. Cl.
*B29D 11/00* (2006.01)
*G02B 3/08* (2006.01)

(52) U.S. Cl.
CPC ............ *B29D 11/00269* (2013.01); *G02B 3/08* (2013.01)

(58) Field of Classification Search
CPC .............................. B29D 11/00269; G02B 3/08
See application file for complete search history.

(56) References Cited

U.S. PATENT DOCUMENTS 4,609,205 A * 9/1986 McKeever ..................... 280/808
4,609,259 A    9/1986 Suemitsu et al. ............... 355/53

(Continued)

FOREIGN PATENT DOCUMENTS

EP  1 714 708    10/2006
JP  6-234156    8/1994

(Continued)

OTHER PUBLICATIONS

Briche, S. et al., "Sol-gel processing and uva patterning of epoxy-based hybrid organic-inorganic thin films", *J. Mater. Sci.* 43(17):5809-5822, 2008.

(Continued)

*Primary Examiner* — Dah-Wei D Yuan
*Assistant Examiner* — Kristen A Dagenais
(74) *Attorney, Agent, or Firm* — Norton Rose Fulbright US LLP (57) ABSTRACT

The present invention relates to a process for manufacturing a segmented optical structure (100), comprising at least the steps consisting in:
a) providing a substrate (1) having microwalls (2) on one of the faces (3) of said substrate, which microwalls form, when the substrate (1) is observed along an axis (X) perpendicular to said face, a plurality of concentric recesses (5);
b) depositing at least one material (10; 10*a*; 10*b*; 10*c*) in at least one recess (5);
c) bringing at least one part of the upper surface (11) of the material (10; 10*a*; 10*b*; 10*c*) deposited in step b) into contact with at least one liquid medium (30) which is capable of dissolving said material (10; 10*a*; 10*b*; 10*c*) and is substantially inert with respect to the microwalls (2) and to the substrate (1); and
d) imposing a centrifugal force on the liquid medium (30) deposited in step c) so as to modify the distribution thereof on the upper surface (11) of the material (10; 10*a*; 10*b*; 10*c*) deposited during step b),
the amount of liquid medium (30) used during step c) enabling the material deposited during step b) to be partially dissolved.

20 Claims, 4 Drawing Sheets

(56) References Cited

U.S. PATENT DOCUMENTS

| | | | |
|---|---|---|---|
| 4,867,776 A * | 9/1989 | Sharp | 65/387 |
| 5,779,751 A * | 7/1998 | Wong | 65/60.3 |
| 6,097,458 A | 8/2000 | Tsuda et al. | 349/113 |
| 2002/0094495 A1* | 7/2002 | Ono et al. | 430/321 |
| 2006/0234607 A1 | 10/2006 | Kimura | 451/42 |
| 2006/0235607 A1* | 10/2006 | Nakashima | 701/200 |
| 2011/0156291 A1* | 6/2011 | Huang | 264/1.1 |
| 2012/0212821 A1* | 8/2012 | Iwata | 359/569 |
| 2013/0273242 A1* | 10/2013 | Krogman et al. | 427/164 |
| 2013/0278892 A1* | 10/2013 | Jiang et al. | 351/159.44 |

FOREIGN PATENT DOCUMENTS

| | | |
|---|---|---|
| JP | 2009-184066 | 8/2009 |
| WO | WO 2009/136093 | 11/2009 |

OTHER PUBLICATIONS

International Search Report issued in PCT Application PCT/IB2011/053955 on Dec. 19, 2011.

Written Opinion of the International Search Authority issued in PCT Application PCT/IB32011/053955 on Dec. 19, 2011.

* cited by examiner

PROCESS FOR MANUFACTURING A SEGMENTED OPTICAL STRUCTURE

CROSS-REFERENCE TO RELATED APPLICATIONS

This application is a national phase application under 35 U.S.C. §371 of International Application No. PCT/IB2011/053955 filed 9 Sep. 2011, which claims priority to French Patent Application No. 1057327 filed 14 Sep. 2010. The entire contents of each of the above-referenced disclosures is specifically incorporated herein by reference without disclaimer.

The present invention relates to processes for preparing segmented optical structures and more particularly Fresnel lenses.

BACKGROUND

A Fresnel lens consists of a central lenticular part generally encircled with structures forming concentric rings (spherical lens) or having linear shapes (cylindrical lens).

The optical quality of a Fresnel lens depends inter alia on the shape of the Fresnel zones, on the surface finish, on the material and on the vertical walls separating two consecutive zones.

A Fresnel lens may have, relative to a conventional convergent lens, a smaller thickness and therefore, advantageously, a higher optical transmission coefficient for the same interception area.

Various process are known for manufacturing Fresnel lenses.

It is, for example, known from JP 062 341 56 to manufacture Fresnel lenses by hot stamping, in which a tool is heated and pressed into a thermoformable material so as to form the Fresnel zones of said lens.

Fresnel lenses may also be manufactured by molding. A method for manufacturing a mold is described in US 2006/0234607.

Hot-stamping or molding manufacturing methods may have the drawbacks of limiting the profile of the Fresnel lenses thus obtained to the shape of the stamp or mold used and of restricting the materials that can be used to thermoformable materials.

JP 2009 184 066 describes the manufacture of Fresnel lenses by micromachining, in which a tool of a suitable shape is used to machine a material in a particular way so as to structure it. Such a method may be relatively costly and is not suitable for mass production.

Moreover, other processes that employ photolithography methods are known. In particular it is known from U.S. Pat. No. 5,779,751 to produce, by photolithography, a stack or succession of pads of various heights, the juxtaposition of these pads eventually forming the features of the Fresnel lens.

However, methods employing photolithography processes can be relatively expensive and involve a large number of processing steps.

Other methods, especially direct structuring in a photosensitive layer, are known, for example from U.S. Pat. No. 4,609,259.

There is however a need for a relatively simple process for manufacturing segmented optical structures.

There is furthermore a need for a process enabling production of segmented optical structures with a wide variety of profiles.

The present invention aims to meet all or some of the aforementioned needs.

SUMMARY

According to one of its aspects, the present invention relates to a process for manufacturing a segmented optical structure comprising at least steps consisting in:
  a) providing a substrate equipped, on one of its faces, with microwalls forming, when the substrate is observed along an axis perpendicular to said face, a plurality of concentric voids;
  b) depositing at least one material in at least one void;
  c) bringing at least one part of the top surface of the material deposited in step b) into contact with at least one liquid medium that is able to dissolve said material and that is substantially inert with respect to the microwalls and substrate; and
  d) applying a centrifugal force to the liquid medium deposited in step c) so as to modify its distribution over the top surface of the material deposited in step b), the amount of liquid medium used in step c) enabling partial dissolution of the deposit produced in step b).

Advantageously, the liquid medium used in steps c) and d) is at least in part vaporizable under the operating conditions of step d).

The expression "top surface of the deposit" is understood to mean the surface of the deposit, located on the side opposite the substrate, covering at least some of said substrate.

The expression "liquid medium that is substantially inert with respect to the microwalls and substrate" is understood to mean that the liquid medium is not capable of affecting the integrity of the substrate and microwalls or even, in other words, of substantially dissolving said substrate and microwalls if the liquid medium makes contact with them.

The expression "plurality of concentric voids" is understood to mean at least two voids centered on a given axis and of circular or polygonal outline. Except for the central void, which may have a disk shape, the other voids are generally ring-shaped and preferably continuous around their axis.

The process described above may, preferably, be a process for preparing a lenticular structure and, in a particularly preferred way, a Fresnel lens.

The process according to the invention has the advantage of allowing an optical structure arranged in the form of a juxtaposition of various optical segments to be obtained directly, said optical segments being generated in a single step.

The process advantageously allows optical structures with segments of at least two, or even more, types to be obtained in a single step, in contrast to conventional processes which, to obtain this type of architecture, generally require, consecutively to the formation of each type of segment, a "mechanical" assembly to form the desired structure.

The process according to the invention may advantageously have relatively fewer processing steps and be simpler to implement.

The process also has the advantage of being able to combine a number of materials and of being able to process large substrates, for example substrates that are larger than 10 cm in size.

The concentric voids formed by the microwalls may, for example, be circular or polygonal about a center of symmetry, when the substrate is observed along an axis perpendicular to the face bearing said microwalls.

The material may, in step b), be deposited in at least 25%, preferably 50%, preferably 75%, preferably substantially all of the voids.

The dissolution of the material deposited in step b) may especially depend on the nature and amount of liquid medium used in step c), on the average rotation speed, and on the time for which said medium is applied in step d).

Step d) may be initiated during or consecutively to step c).

According to another of its aspects, the present invention relates to a segmented optical structure manufactured according to the process described above.

The rest of the description describes the various steps of the process according to the invention in greater detail.

Unless otherwise stated, the average quantities described in the following are arithmetic means.

Step a)

Substrate

The nature of the substrate used depends on the segmented optical structure to be produced, which structure may be intended to be used in transmission or reflection.

When the segmented optical structure is intended to be used in transmission, the substrate may, for example, comprise and especially consist of:
- a polymer, for example chosen from polymethyl methacrylate (PMMA), silicones or polycarbonate (PC);
- an inorganic material, for example chosen from glass or sapphire;
- a hybrid material, for example a hybrid sol-gel material.

When the segmented optical structure is intended to be used in reflection, the substrate may, for example, comprise and especially consist of, a metal, for example chosen from steel, aluminum, gold, molybdenum, silver or an alloy of the aforementioned metals.

When the segmented optical structure is intended to be used in reflection, the substrate may, for example, comprise and especially consist of, a layer of a material covered with a reflective coating.

The substrate may, according to one embodiment, be made of glass, especially soda-lime or borosilicate glass.

The substrate may be any shape, especially circular or polygonal, for example it may be square.

The size of the substrate, especially its diameter, may be between a few mm and a few tens of cm.

The expression "size of the substrate" is understood to mean the largest dimension of the substrate.

The size of the substrate generally depends on the intended application of the segmented optical structure according to the invention.

The thickness of the substrate may, for example, be between a few tens of microns and several tens of mm.

The face of the substrate bearing the microwalls may be planar.

Microwalls

The microwalls especially have the function of allowing the profile of the segmented optical structure according to the invention to be formed under the effect of the centrifugal force applied in step d). Following the process according to the invention, the microwalls lead to a discontinuity in the profile of the segmented optical structure according to the invention.

The microwalls present on the substrate may all be made of the same material.

As a variant, the microwalls may be made of different materials.

By way of nonlimiting illustration, the microwalls may comprise and especially consist of:
- an organic polymer, preferably chosen from photoresists taking the form of a liquid or of a dry film, especially capable of allowing microwalls with an average height of between a few microns and several tens of even several hundred microns to be obtained;
- a hybrid sol-gel material, especially the hybrid materials sold under the trade names ORMOCER® or K-CL by KLOE; or
- mixtures thereof.

A first microwall may, for example, be made of a nitride and a second microwall may, for example, be made of glass.

The microwalls of the segmented optical structure according to the invention may, for example, have substantially the same height.

As a variant, the microwalls may have different heights.

The microwalls of the segmented optical structure according to the invention may, for example, have substantially the same width.

As a variant, the microwalls may have different widths

The segmented optical structure obtained following the process of the invention may have microwalls having at least one and preferably all of the following features:
- the average height of the microwalls is between a few tens of nm and several tens of µm, for example between 200 nm and 500 µm;
- the average width of the microwalls is between a few tens of nm and several tens of µm, for example between 20 nm and 50 µm;
- the average spacing between two consecutive microwalls is between a few tens of microns and several mm; and
- the microwalls are between a few and several thousand in number, for example between 20 and 5000 in number.

The microwalls may remain in place once the process according to the invention has been completed.

As a variant, at least some, for example substantially all, of the microwalls may be removed once the process according to the invention has been completed. A chemical etching step may, for example, be carried out in order to remove at least some of the microwalls.

The etching operating carried out to remove the microwalls depends on their nature and may be a chemical etching operation in a bath or a plasma etching process (dry etching).

Among liquid photoresists able to produce microwalls that can be removed once the process according to the invention has been completed, mention may for example be made of the compounds sold under the trade name THB151N, by JSR Micro, and under the trade names NR21 or NFR15, by Futurrex.

Among liquid photoresists able to produce microwalls that are not intended to be removed once the process according to the invention has been completed, mention may for example be made of the compound sold under the trade name SU8 50 by Microchem.

Among dry-film photoresists able to produce microwalls that can be removed once the process according to the invention has been completed, mention may for example be made of the compounds belonging to the MX range sold by Dupont.

Among dry-film photoresists able to produce microwalls that are not intended to be removed once the process according to the invention has been completed, mention may for example be made of TMMF S2000 from TOK.

The use of a dry-film photoresist may advantageously allow a process to be obtained that is relatively simple to implement, especially having fewer steps.

In one embodiment, the raw precursor materials of the material forming the microwalls may be identical to the material that will be deposited in step b). However, in this case, the conversion of said raw materials into the material forming the microwalls will make the latter inert with respect to the liquid medium applied in step c).

Microwalls with substantially the same height may, for example, be produced by photolithography with positive or negative photoresists using a masking step, or by direct laser writing, ion- or electron-beam lithography, nanoimprint lithography, molding or injection molding, or by micromachining, especially by laser ablation.

Microwalls with different heights may, for example, be produced by photolithography with a positive resist using a grayscale masking step, or by direct laser writing, ion- or electron-beam lithography, or by micromachining, especially by laser ablation or by chemical mechanical polishing (CMP) of the positive or negative resist deposited over the entire wafer.

By way of indication:
hybrid sol-gel resists sold under the trade name K-CL by KLOE; and
organic resists sold under the references SU8 and NFR15, may, for example, be compatible with the lithography processes.

Step b)

Nature of the Material Deposited in Step b)

The choice of the material deposited in step b) is within the competences of a person skilled in the art and depends on the features of the optical structure to be produced.

The material deposited in step b) may comprise and especially consist of:
an organic polymer, especially such as described above for the microwalls;
an inorganic material, especially chosen from doped or undoped silica, produced by the sol-gel process;
a hybrid sol-gel material;
mixtures thereof.

The choice of the material deposited in step b) is also constrained by the fact that it alone must be dissolved in the liquid medium dispensed in step c).

The material deposited in step b) may, more particularly, be a hybrid sol-gel material.

A process for synthesizing an example of a hybrid sol-gel material that can be used in the context of the present invention is described in WO 2009/136093 A1 and in the publication "S. Briche, D. Riassetto, C. Gastaldin, C. Lamarle, O. Dellea, D. Jamon, E. Pernot, M. Labeau, G. Ravel, M. Langlet, *Sol-gel processing and uva patterning of epoxy-based hybrid organic-inorganic thin films*, J. Mater. Sci., Vol. 43, No. 17, pp. 5809, 2008".

The height of the deposit produced in step b) may be substantially constant.

As a variant, the height of the deposit produced in step b) varies.

The average height of the deposit produced in step b) may be between a few nm and several hundred μm.

The average height of the deposit produced in step b) may be between one hundredth of the average height of the microwalls and several times the average height of the microwalls.

The level of the top surface of the deposit may optionally be such that all or part of the height of the microwalls is covered by the material deposited.

Thus, in one embodiment, the microwalls may be completely embedded in the deposit produced in step b).

As a variant, the microwalls may each be taller than the height of the deposit produced in step b).

The average height of the deposit produced in step b) is an adjustable parameter that may depend on the features of step c), and on the properties of the optical structure to be produced.

The material may, in step b), be deposited in at least 25%, preferably 50%, preferably 75% of the voids.

In a particularly preferred way, the material is, in step b), deposited in substantially all the voids.

Multi-Material Deposits

In one embodiment, a plurality of different materials can be deposited in step b).

Thus, following step b), at least one void may contain a multilayer deposit comprising a stack of at least two layers each formed from a different material.

In particular, the center of the substrate may, following step b), be covered with a multilayered deposit made of different materials.

Advantageously, a void containing such a multilayer structure may, for example, give the segmented optical structure according to the invention particular optical properties, especially an index gradient, or serve as an antireflection or optoelectronic (sensor) layer.

Optionally, in combination with the embodiment regarding multilayer deposition in a given void described above, it is possible, following step b), for a first void to contain a deposit of a first material and for a second void to contain a deposit of a second material different from the first.

The material may be deposited using a wet or dry process.

The method used to deposit the material may depend on whether it is desired, following step b), to obtain a deposit of substantially constant or variable height.

When it is desired to obtain, following step b), a deposit of substantially constant height, the material may, for example, be deposited via spin-coating, dip-coating sputtering, or chemical vapor deposition, especially atmospheric pressure chemical vapor deposition (CVD and APCVD, respectively).

When it is desired to obtain, following step b), a deposit of varying height, the material may, for example, be deposited by ink-jet printing or microdispensing.

Step b) may furthermore comprise a step of stabilizing the deposit obtained, especially by means of a bake.

Optionally, the features of step b) may be adjusted in order to produce a deposit with a planar top surface.

Step b) may furthermore comprise a step of shaping the top structure of the deposit produced, especially allowing its curvature to be modified.

This shaping step may furthermore allow the height of at least one microwall to be modified. It is thus possible to pass from a structure where the microwalls have substantially the same height to a structure where the microwalls have different heights.

The shaping step may, for example, be carried out by mechanical means, and may especially be a chemical mechanical polishing step.

Step c)

Nature of the Liquid Medium

As mentioned above, the liquid medium must allow some of the deposit produced in step b) to be dissolved while remaining inert with respect to the microwalls, the function of which is to block the flow of said liquid medium in step d).

The liquid medium may comprise and especially consist of:
an acid, preferably hydrofluoric acid;
an alcohol, preferably chosen from isopropyl alcohol, ethanol or mixtures thereof;
a photoresist developer, for example chosen from MF319 sold by Rohm and Haas, TMAH (tetramethylammonium hydroxide) or RD6 (trade name of the developer of resist NR2-2000p sold by Futurrex).

The liquid medium may, for example, consist of a solution of one or more compounds chosen from the above list and present in a concentration higher than or equal to 1 vol % relative to the total volume of said solution.

MF319 sold by Rohm and Haas may, for example, be used when the microwalls are made of NFR 15.

TMAH may, for example, be used when the microwalls are made of THB151N sold by JSR Micro.

RD6 may, for example, be used when the microwalls are made of NR21 sold by Futurrex.

When the material deposited in step b) is a hybrid sol-gel material, the liquid medium may, in particular, be an alcohol, such as, for example, isopropyl alcohol.

Dispensing of the Liquid Medium

The volume of liquid medium dispensed in step c) may be between a few mL and several L, for example between 3 mL and 5 L.

The average flow rate of the liquid medium dispensed in step c) may be between a few mL/s and several L/s.

The pressure of the liquid medium dispensed in step c) may be lower than 1 bar.

The liquid medium may be dispensed by a system for dispensing the liquid medium, which may move in all or part of step c).

As a variant, the system for dispensing the liquid medium may remain stationary during step c).

When the system for dispensing the liquid medium moves in all or part of step c), the latter may be driven by a continuous or discontinuous movement.

The system for dispensing the liquid medium may even remain stationary during step c) and the movement of the substrate may comprise a translation component.

The liquid medium may be discontinuously and controllably dispensed on at least one part of the top surface of the deposit produced during step b).

The liquid medium may be applied to at least 25%, preferably at least 50%, preferably at least 75%, preferably substantially all of the top surface of the deposit produced in step b).

The amount of liquid medium introduced into at least one void being adjustable and such that the liquid medium covers all of the top surface of the deposit produced in said void.

The liquid medium may, for example, be dispensed via a nozzle, by ink-jet printing or spraying.

Step d)

The rotation speed of the substrate defines how rapidly the liquid medium spreads, in the deposition carried out in step b), and therefore the interaction time between said liquid media and said deposit.

Furthermore, the features of step d) (in particular the speed and duration of the rotation) may be adjusted so as to promote vaporization of the liquid medium.

Step d) may be between a few seconds and several tens of minutes in duration, for example lasting between 5 seconds and 100 minutes.

The process described above may, for example, be such that:
 the centrifugal force is applied, during step d), to the assembly consisting of the substrate, the microwalls and the deposited material and liquid medium; and
 the average rotation speed, during step d), of the substrate about the axis perpendicular to the face bearing the microwalls, material and liquid medium, is between a few revolutions/minute and several thousand revolutions/minute, especially between 5 revolutions/minute and 5000 revolutions/minute.

When the rotation of the substrate starts, the acceleration may be between a few revolutions/minute/s and several thousand revolutions/minute/s.

The centrifugal force applied in step d) may, in one embodiment, be maintained until the liquid medium has completely evaporated.

As a variant, the liquid medium may be evaporated after application of said centrifugal force has stopped.

Of course, the features of step d) depend on the material deposited in step b), on the nature and amount of liquid medium employed, and on the nature (size, complexity, etc.) of the segmented optical structure to be produced.

Operating Conditions

Steps c) and/or d) may take place in a chamber in which the temperature is between 3° C. and 50° C.

Steps c) and/or d) may, for example, take place in a chamber in which the pressure is between atmospheric pressure and several tens of bars.

Steps c) and/or d) may take place in a chamber in which the relative humidity is between 10% and 70% and preferably between 20 and 55%.

The expression "relative humidity" is understood to mean the ratio of the partial vapor pressure of water present in the chamber, said chamber having a given pressure and temperature, to the saturated vapor pressure of water at said chamber temperature and pressure.

DESCRIPTION OF THE FIGURES

The invention will be better understood on reading the following detailed description of nonlimiting embodiments thereof, and on examining the appended drawings, in which.

For the sake of conciseness, the steps of the process according to the invention have been described in FIGS. 1 to 4 in the context of a single embodiment of the substrate, microwalls and deposited material. However, the process according to the invention may, as specified below, apply to a number of variants of the substrate, microwalls and deposited material.

Figure 1:
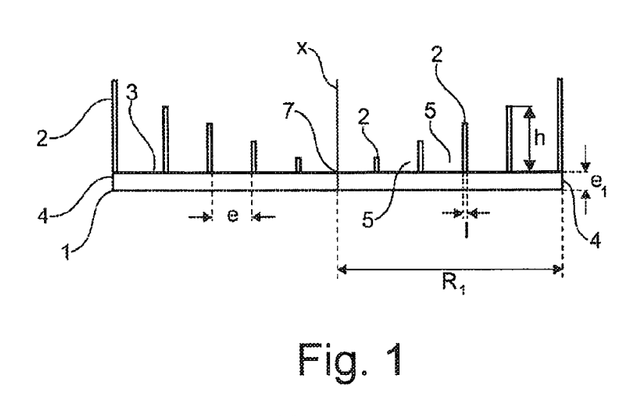
FIGS. 1 to 4 schematically show various steps of the process according to the invention.

FIG. 1 shows a cross section through a substrate 1 comprising microwalls 2 on one of its faces 3.

The substrate 1 may, when observed along an axis X perpendicular to the face 3 and passing through the center 7 of the substrate, be of any shape, especially circular or polygonal about a center of symmetry, especially square.

The thickness $e_1$ of the substrate 1 may be substantially constant, as illustrated in FIG. 1.

The microwalls 2 may be made of a different material from that of the substrate 1. As a variant, the microwalls 2 and the substrate 1 are made of the same material.

The microwalls 2 bound a plurality of concentric voids 5.

The microwalls 2 may, as illustrated, have a substantially symmetric arrangement about a plane containing the axis X. The microwalls 2 may especially be axisymmetric about this axis X.

One microwall 2 may, as shown in FIG. 1, be located adjacent the peripheral edge 4 of the substrate 1.

The height h of the microwalls 2 may, as shown in FIG. 1, vary monotonically with distance from the center 7 of the substrate, over the entire radius $R_1$ of the substrate. This height h may, for example as illustrated, increase with distance from the center 7 of the substrate, over the entire radius $R_1$.

As a variant (not shown) the height of the microwalls need not vary monotonically over the entire radius of the substrate with distance from the center of the substrate. It is, for example, possible for the height to increase, with distance from the center of the substrate, over a first segment of the substrate and then decrease over a second segment of the substrate. As a variant, the height may, with distance from the center of the substrate, decrease over a first segment of the substrate and then increase over a second segment of the substrate.

The microwalls 2 may, as shown in FIG. 1, have substantially the same width l.

The spacing e between two consecutive microwalls 2 may, as shown in FIG. 1, be substantially constant for at least three consecutive microwalls 2.

Figure 2:
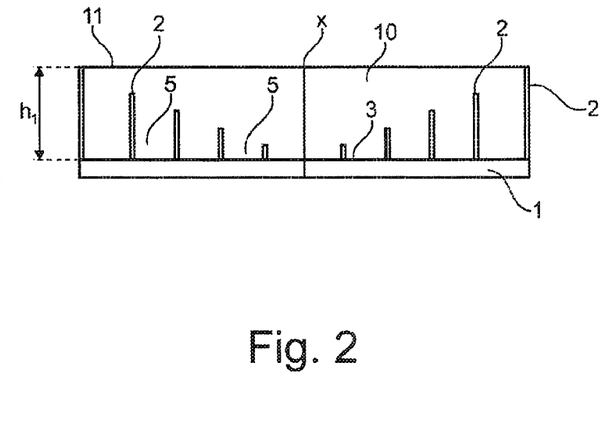

FIG. 2 shows the deposit produced in step b), a material 10 having been deposited in all of the voids 5. The material 10 deposited is bounded in height by a deposit top surface 11. The deposit top surface 11 may, as illustrated in FIG. 2, be planar.

In one variant (not shown) the material is deposited in only some of the voids.

The height $h_1$ of the deposit produced in step b) may, as shown in FIG. 2, be substantially constant.

Figure 3:
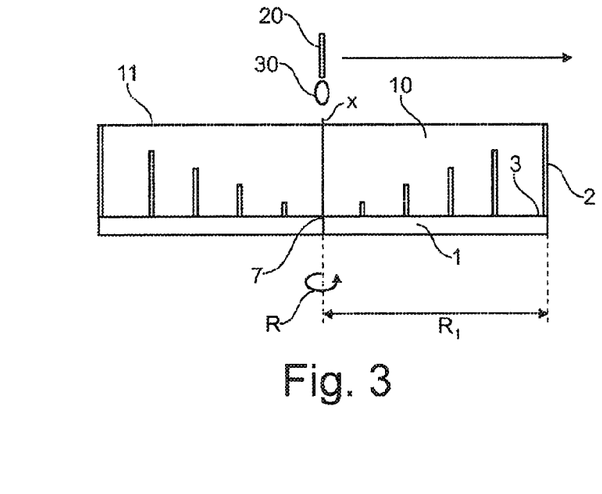

FIG. 3 schematically shows steps c) and d).

A dispensing system 20 allows the liquid medium 30 to be brought into contact with the top surface 11 of the deposit. The system 20 for dispensing the liquid medium 30 may especially be an injection nozzle.

The system for dispensing 20 the liquid medium 30 may, as illustrated in FIG. 3, move during step c).

The dispensing system 20 may be moved, in step c), continuously or discontinuously along the radius $R_1$ of the substrate. In other words, the dispensing system 20 may, in step c), move without stopping along the top surface 11 of the deposit, or alternate between steps of moving and stopping, respectively.

Independently of whether the movement of the dispensing system 20 is continuous or not, the liquid medium 30 may, in step c), be dispensed continuously or discontinuously. In other words, the flow of liquid medium 30 may, in step c), be uninterrupted, or interrupted and then restarted at least once, respectively.

Independently of whether the movement of the dispensing system 20 and the dispensing of the liquid medium 30 are continuous or not, the dispensing system 20 may, in step c), move along the top surface 11 of the deposit away from the center 7 of the substrate. As a variant, the dispensing system 20 moves, in step c), along the top surface 11 of the deposit toward the center 7 of the substrate.

The dispensing system 20 may, in particular, travel, in step c), a distance smaller than or equal to, especially substantially equal to, the radius $R_1$ of the substrate. The liquid medium 30 may, in one embodiment, in step c), only be dispensed over part of the top surface 11 of the deposit.

The scope of the present invention is not, of course, exceeded if a number of different liquid mediums 30 are dispensed in step c).

As a variant (not shown), the system 20 for dispensing the liquid medium 30 may remain stationary throughout step c), for example being located above the center 7 of the substrate.

As shown in FIG. 3, the assembly formed by the substrate 1, the microwalls 2 and the material 10 is made to rotate R in order to apply a centrifugal force to the liquid medium 30 once it has been brought into contact with the top surface 11 of the deposit.

The rotation R may be applied before the start of step c), during step c) or consecutively to step c).

Figure 4:
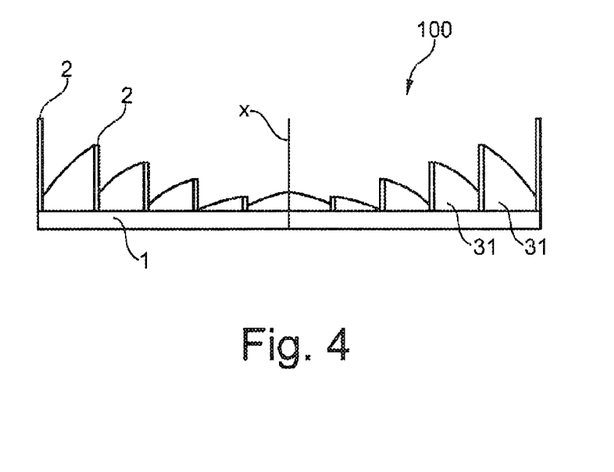

FIG. 4 shows a segmented optical structure 100 obtained following the process according to the invention.

This optical structure 100 may, in a particularly preferred way, form a Fresnel lens and the zones 31 may form the various Fresnel zones of said lens, the microwalls 2 bounding the various Fresnel zones 31 of the lens obtained.

Figure 1A:
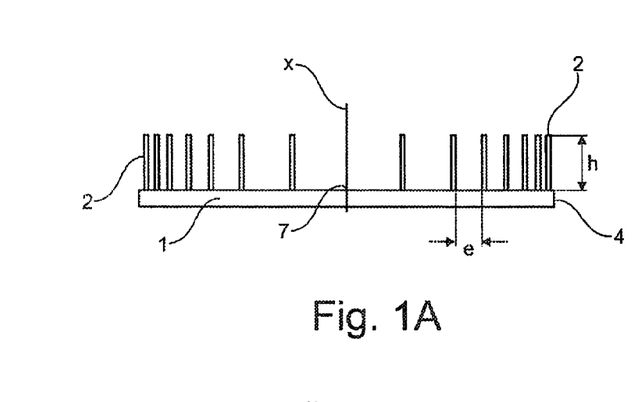
FIG. 1A schematically shows a variant of the microwalls shown in FIGS. 1 to 4.

Independently of the embodiment considered, the microwalls 2 may have substantially the same height h, as shown in FIG. 1A.

Independently of the embodiment considered, the spacing e between two consecutive microwalls 2 may vary, as illustrated in FIG. 1A.

This irregularity may, as illustrated in FIG. 1A, result in the density of microwalls 2 being higher near the peripheral edge 4 of the substrate, relative to the density of microwalls 2 in a zone nearer the center 7 of the substrate.

Figure 5:
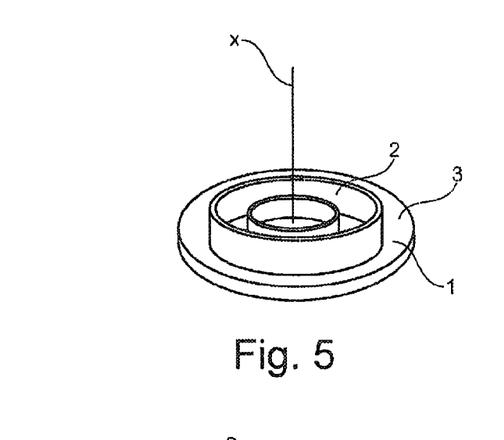
FIG. 5 schematically shows a perspective view of a substrate equipped with microwalls.

FIG. 5 shows a perspective view of a substrate 1 where the microwalls 2 are circular when observed along the axis X.

Figure 2A:
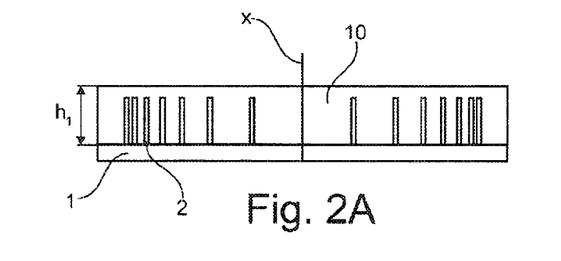
FIGS. 2A to 2F schematically show variants of the deposit shown in FIG. 2.
Figure 2B:
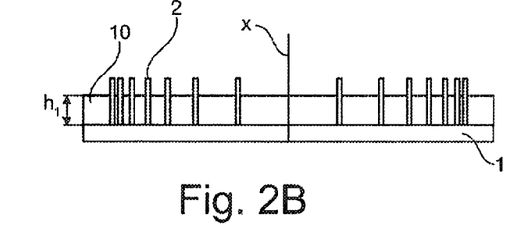

Independently of the embodiment considered, the deposit produced in step b) may have a constant height $h_1$ covering the microwalls 2 in their entirety, or covering only part of the microwalls 2, as shown in FIGS. 2A and 2B, respectively.

Figure 2C:
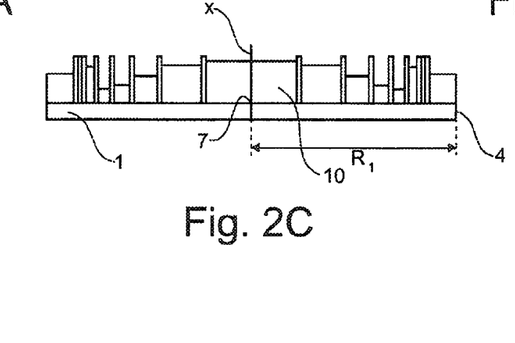

Independently of the embodiment considered, the material 10 deposited may be of varying height, as shown in FIG. 2C.

Independently of the embodiment considered, and as illustrated in FIG. 2C, it is possible for the height of the deposit produced in step b) not to vary monotonically over the entire radius $R_1$ with distance from the center 7 of the substrate.

Figures 2D, 2E, 2F:
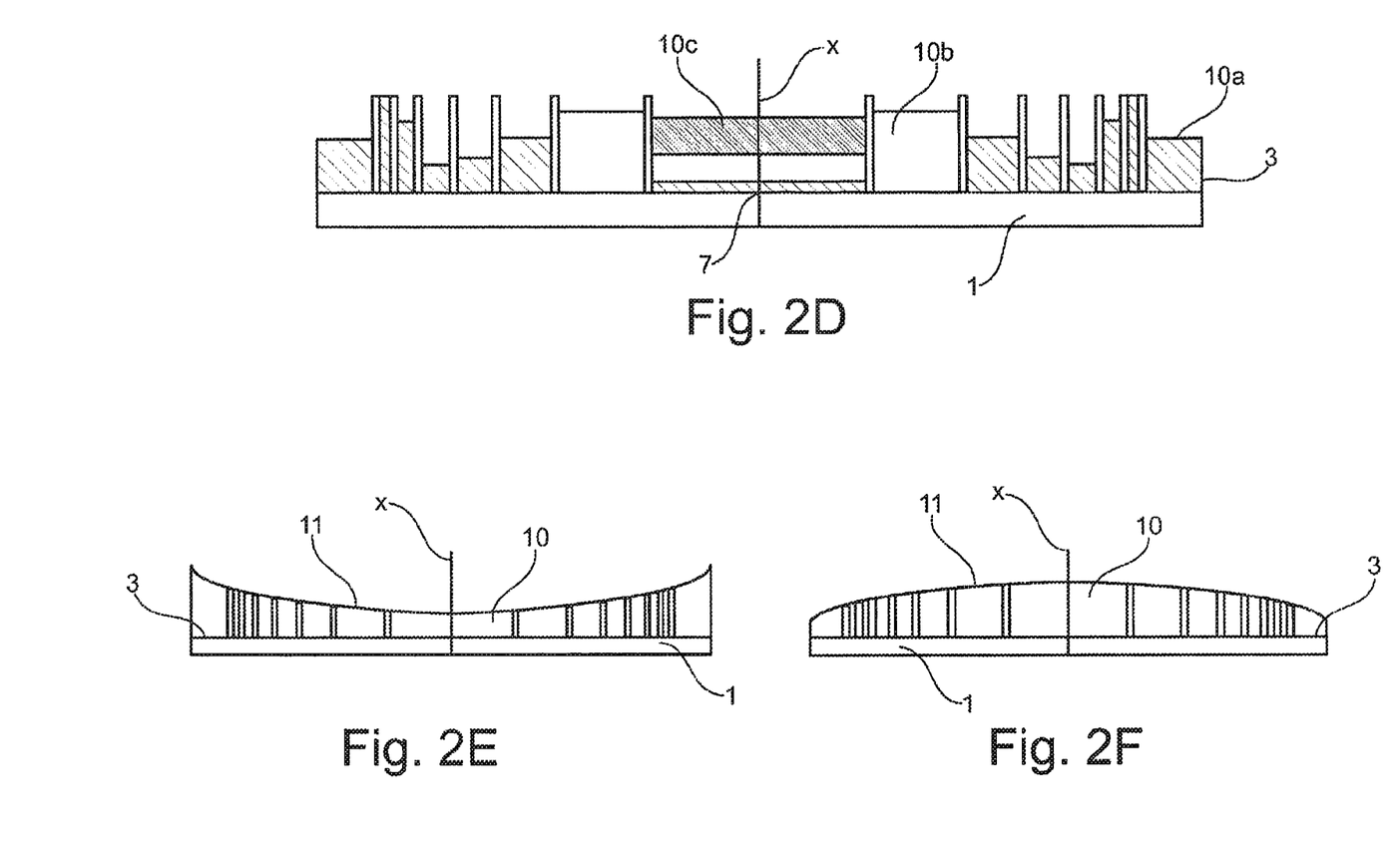

Independently of the embodiment considered, the substrate 1 may, as illustrated in FIG. 2D, comprise, following step b), three different deposited materials 10a, 10b and 10c.

In this case, as illustrated in FIG. 2D, the center 7 of the substrate may, for example, be covered with a multilayer deposit made of a number of materials 10a, 10b and 10c.

As a variant (not illustrated), a first void contains a deposit made of a single first material, and a second void, different from the first, contains a deposit made of a single second material that is different from the first material.

As for FIGS. 2E and 2F, they show substrates 1 obtained following a step b) that comprises a step of reshaping the top surface 11 of the material 10 deposited.

Thus, following step b), the substrate 1 may comprise a deposit top surface 11 that is convex toward the exterior or concave toward the exterior, as illustrated in FIGS. 2E and 2F, respectively.

Such a reshaping step may, for example, involve a chemical mechanical polish, the shape of the tool defining the shape of the top surface 11 of the deposit obtained.

EXAMPLE

Step 1: Formation of the Microwalls on a Face of a Substrate

A substrate taking the form of a 5×5 cm sheet of 1.1 mm-thick soda-lime glass was provided.

A photosensitive hybrid sol-gel was deposited on this substrate by spin-coating with a Gyrset system. The parameters used in this spin-coating step were the following:
acceleration: 2000 revolutions/minute/second;
speed: 1450 revolutions/minute; and duration: 30 seconds.

Once the spin-coating step was finished, a bake was carried out on a hot plate for 3 minutes at 80° C.

A laser writing step was then carried out. It had the following features:
wavelength: 375 nm;
resolution: 5 µm; and
incident power before focusing: 100 µW.

Following the laser writing, a bake was carried out on a hot plate at 80° C. for 9 minutes.

The product obtained was then subjected to a step of development by immersion in isopropyl alcohol, which was agitated, for 20 minutes.

A final bake was carried out in an oven at 120° C. for 15 minutes.

Figure 6:
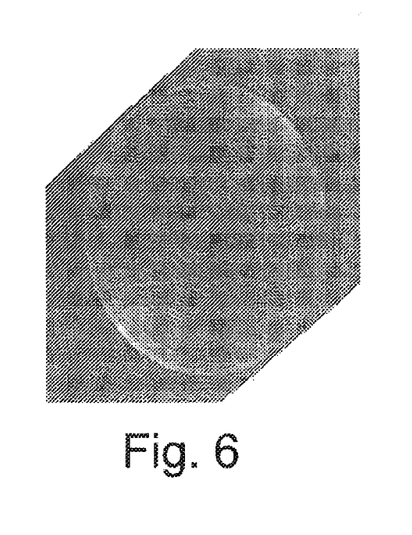
FIG. 6 shows a photograph of a top view of a substrate comprising microwalls that can be used in the context of the process according to the invention.

A photograph of a substrate having microwalls, obtained by direct laser writing, on one of its faces is shown in FIG. 6. The structure produced was circular.

Step 2: Deposition of the Material in the Voids Bounded by the Microwalls

The substrate bearing the microwalls, obtained following step 1, described above, was placed in a spin-coater equipped with a Gyrset system. The center of the circular microwalls was superposed on the axis of rotation of the spin-coating machine.

2 mL of hybrid sol-gel solution was deposited with a micropipette, the micropipette being moved, while the solution was being deposited, in a spiral from the center toward the exterior of the substrate so as to maximize coverage of the sample.

The chuck was made to rotate, with the Gyrset system in place, with the following parameters:
acceleration: 1000 revolutions/minute/second;
speed: 400 revolutions/minute;
duration: 30 seconds.

A post-deposition bake was carried out for 3 minutes on a hot plate at 80° C.

Step 3: Partial Dissolution of the Material Deposited in the Voids

The product obtained following step 2, described above, was placed on the sample holder of the spin coater. The center of the circular microwalls was superposed on the center of rotation.

The product was then made to rotate, without the Gyrset system in place, with the following parameters:
acceleration: 1000 revolutions/minute/second;
speed: 400 revolutions/minute; and
duration: 3 minutes.

The programmed three minutes were used to dispense and dry the sheet.

Isopropyl alcohol, which is able to dissolve the material deposited in the voids, was discontinuously dispensed for one minute. The isopropyl alcohol was dispensed in the center of the sample using a micropipette; the volume deposited was about 30 mL.

The sample was dried during the two remaining minutes of rotation.

Figure 7:
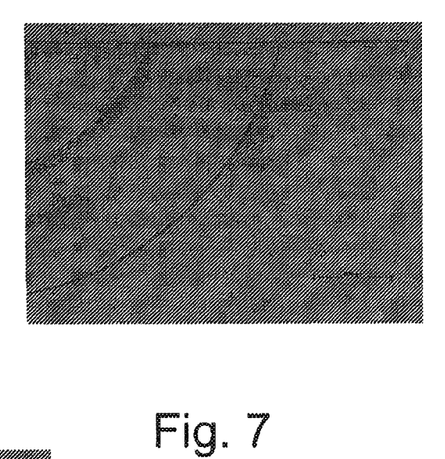
FIGS. 7 and 8 show photographs of a segmented optical structure obtained by virtue of the process according to the invention.
Figure 8:
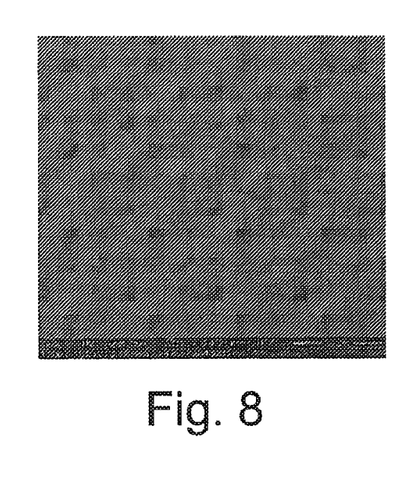

Two photographs of the Fresnel lens obtained following step 3 are shown in FIGS. 7 and 8.

Unless otherwise indicated, the expression "comprising/containing a" must be understood to mean "comprising/containing at least one".

Unless otherwise indicated, the expression "between . . . and . . . " must be understood to include the limiting values.

The invention claimed is:

1. A process for manufacturing a segmented optical structure comprising at least steps consisting in:
    a) providing a substrate equipped, on one of its faces, with microwalls forming, when the substrate is observed along axis (X) perpendicular to said face, a plurality of concentric voids;
    b) depositing at least one material in at least one void to produce a deposit having top surface;
    c) bringing at least one part of the top surface of the material deposited in step b) into contact with an amount of at least one liquid medium that dissolves said material and that is inert with respect to the microwalls and substrate; and
    d) applying a centrifugal force to the liquid medium deposited in step c) so as to modify its distribution over the top surface of the material deposited in step b);
    wherein the amount of liquid medium used in step c) enables partial dissolution of the deposit produced in step b).

2. The process of claim 1, wherein step d) is initiated during or consecutively to step c).

3. The process of claim 1, wherein the liquid medium is discontinuously and controllably dispensed on at least one part of the top surface of the deposit produced in step b).

4. The process of claim 1, wherein the liquid medium is applied to at least 25% of the top surface of the deposit produced in step b).

5. The process of claim 1, wherein step c), step d), or steps c) and d) takes place in a chamber in which the temperature is between 3° C. and 50° C.

6. The process of claim 1, wherein step c), step d), or steps c) and d) takes place in a chamber in which the relative humidity is between 10% and 70%.

7. The process of claim 1, wherein the material in step b) is deposited in substantially all the voids.

8. The process of claim 1, wherein the deposit produced in step b) has a constant height.

9. The process of claim 1, wherein the deposit produced in step b) has a varying height.

10. The process of claim 1, wherein a plurality of different materials are deposited in step b).

11. The process of claim 1, wherein a plurality of different liquid mediums are dispensed in step c).

12. The process of claim 1, wherein the microwalls comprise:
    an organic polymer;
    a hybrid sol-gel material; or
    a mixture thereof.

13. The process of claim 12, wherein the organic polymer is a photoresist in form of a liquid or in form of a dry film.

14. The process of claim 12, wherein the liquid medium comprises:
    an acid;
    an alcohol; and
    a photoresist developer.

15. The process of claim 14, wherein the acid is hydrofluoric acid and the alcohol is isopropyl alcohol, ethanol, or a mixture thereof.

16. The process of claim 1, wherein the amount of liquid medium introduced into at least one void is adjustable such that the liquid medium covers all of the top surface of the deposit produced in said void.

17. The process of claim 1, wherein the material deposited in step b) is a hybrid sol-gel material.

18. The process of claim 1, wherein the segmented optical structure obtained is a lenticular structure.

19. The process of claim 18, wherein the lenticular structure is a Fresnel lens.

20. The process of claim 18, wherein the microwalls bound Fresnel zones of the Fresnel lens.

* * * * *

UNITED STATES PATENT AND TRADEMARK OFFICE
CERTIFICATE OF CORRECTION

PATENT NO. : 9,156,216 B2  
APPLICATION NO. : 13/821925  
DATED : October 13, 2015  
INVENTOR(S) : Olivier Dellea and Pascal Fugier It is certified that error appears in the above-identified patent and that said Letters Patent is hereby corrected as shown below:

In the claims

Claim 7, Column 12, Line 38:

Delete "substantially".

Signed and Sealed this  
Eighth Day of March, 2016

Michelle K. Lee  
*Director of the United States Patent and Trademark Office*